(12) United States Patent
Wang et al.

(10) Patent No.: US 9,261,638 B2
(45) Date of Patent: Feb. 16, 2016

(54) LIGHT GUIDE FILM

(75) Inventors: Kong-Hua Wang, Dasi Town (TW);
Kai-Jing Wang, Dasi Town (TW);
Fang-Chun Yeh, Dasi Town (TW);
Ching-An Yang, Dasi Town (TW);
Yi-Chun Huang, Dasi Town (TW)

(73) Assignee: UBRIGHT OPTRONICS Corporation, Taoyuan County (TW)

( * ) Notice: Subject to any disclaimer, the term of this patent is extended or adjusted under 35 U.S.C. 154(b) by 95 days.

(21) Appl. No.: 13/155,309

(22) Filed: Jun. 7, 2011

(65) Prior Publication Data

US 2011/0299012 A1 Dec. 8, 2011

Related U.S. Application Data

(63) Continuation-in-part of application No. 13/073,859, filed on Mar. 28, 2011, now Pat. No. 8,638,408.

(60) Provisional application No. 61/352,339, filed on Jun. 7, 2010.

(51) Int. Cl.
*G02F 1/1335* (2006.01)
*F21V 8/00* (2006.01)
*F21S 8/00* (2006.01)
*G02B 6/00* (2006.01)

(52) U.S. Cl.
CPC . *G02B 6/003* (2013.01); *F21S 8/00* (2013.01); *G02B 6/00* (2013.01); *G02F 1/133615* (2013.01); *Y10T 156/1089* (2015.01)

(58) Field of Classification Search
CPC ............... G02F 1/133615; G02B 6/00–6/005
USPC ...................... 349/61–69; 359/599
See application file for complete search history.

(56) References Cited

U.S. PATENT DOCUMENTS

| | | | | |
|---|---|---|---|---|
| 5,066,099 | A * | 11/1991 | Yoshida et al. | 359/457 |
| 5,126,882 | A * | 6/1992 | Oe et al. | 359/619 |
| 6,123,431 | A * | 9/2000 | Teragaki et al. | 362/625 |
| 6,819,372 | B2 * | 11/2004 | Kashima | 349/65 |
| 7,991,257 | B1 * | 8/2011 | Coleman | 349/61 |
| 8,035,771 | B2 * | 10/2011 | Brott et al. | 349/65 |
| 2006/0204720 | A1 * | 9/2006 | Biernath et al. | 428/156 |
| 2007/0160811 | A1 * | 7/2007 | Gaides et al. | 428/172 |

* cited by examiner

*Primary Examiner* — Dung Nguyen
(74) *Attorney, Agent, or Firm* — Min-Lee Teng; Litron Patent and Trademark Office (57) ABSTRACT

A flexible light guide film having a light-adjusting structure in the form of a lenticular-like microstructure on the bottom side of the light guide film. The light guide film has a substrate layer supporting a layer light-adjusting structure, which is in the form of an array of longitudinal lenticular lenses laterally arranged in parallel. A prismatic-like microstructure may be provided on the top light emitting side of the light guide film. The light guide film is fabricated by a process involving coating/embossing of a roll of sheet material, in a roll-to-roll continuous process. Advantages includes significantly reducing the thickness of the light guide film, and the roll-to-roll fabrication process provides for more precise replication of the microstructures on the master mold or drum onto the surface of the light guide film, which in turn reduces the failure rate and manufacturing cost.

25 Claims, 5 Drawing Sheets

LIGHT GUIDE FILM

CROSS-REFERENCE TO RELATED APPLICATION

The present application claims priority of U.S. Provisional Application Ser. No. 61/352,339 filed on Jun. 7, 2010. The present application is a continuation-in-part of U.S. patent application Ser. No. 13/073,859 filed on Mar. 28, 2011.

All publications noted in the present application are incorporated by reference herein as if fully set forth herein.

BACKGROUND OF THE INVENTION

1. Field of Invention

The present invention relates to light guides, particularly to light guides for use in flat panel displays, and more particularly to light guides for use in liquid crystal display panels.

2. Description of Related Art

In a liquid crystal display (LCD) panel, the liquid crystal (LC) layer does not emit light inherently, as compared to, for example, an electro-luminescent material layer in a plasma display panel. The LC layer or panel functions as a modulator of light transmitted through the LC layer. In a backlit LCD panel, a backlight module serves as a planar light source, which is an important element of the LCD panel, and is critical for enhancing the brightness of the LCD panel. The backlight module includes a light guide plate, for guiding light from a planar array of light sources (e.g., a planar array of LEDs), or a linear light source (e.g., a cold cathode fluorescence (CCF) tube, or a row of LEDs). Backlight modules having the latter linear light source are referred in the art as edge-lid backlight modules.

Heretofore, conventional light guide plates incorporated in edge-lit backlight modules utilize total internal reflection to direct light from a light source positioned at an edge surface of the light guide plate to a light emitting major planar surface facing towards the LC panel. The light from the light source is guided to propagate through the light guide plate to an opposite edge surface of the light guide plate, so that light can be emitted from the entire planar surface towards the LC panel. In the past, the other major planar surface of the light guide plate (e.g., the bottom surface) opposite to the light emitting planar surface is provided with a structure that facilitates reflection of light towards the top planar surface. For example, in some prior art light guide plates, a reflective layer may be provided at the bottom surface, reflecting light back into the light guide plate. In other prior art light guide plates, the bottom surface of the light guide plate opposite to the light-exit surface is textured with light-reflecting or light-scattering surface dots. Light beams encountering these dots are diffused and/or reflected towards the light emitting surface of the light guide. More particularly, the light-reflecting or light-scattering dots formed or embedded on the bottom surface of the abovementioned conventional light guide plate are capable of changing the direction of propagation of light beams so as to spread light from the linear light source across the planar light emitting surface, thereby forming a planar light source emitting light from a plane. The diffused and reflecting surface of the light-reflecting or light-scattering dots are generally matte as a result of the fabrication process. Accordingly, a great deal of energy is required by the point or linear light source to produce planar light output of acceptable brightness, resulting in waste of electrical power consumption.

Figure 1:
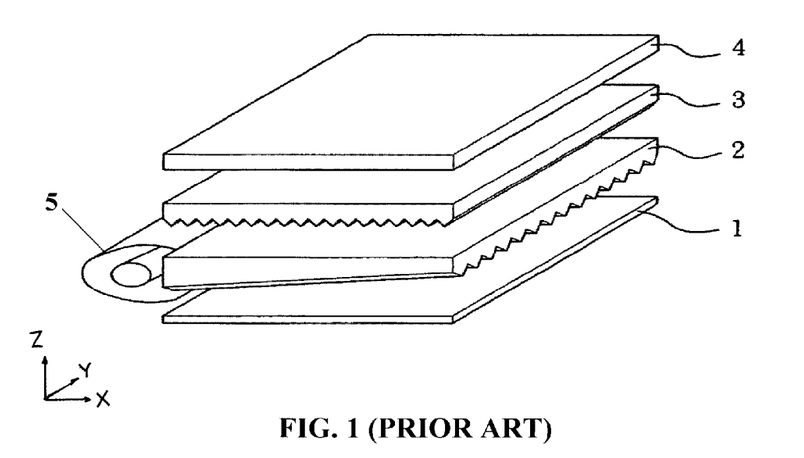
FIG. 1 schematically illustrates the structure of a prior art backlight module.

Another technique using a V-cut light guide plate has been developed in the field of backlight modules. The V-cut light guide plate is made mainly by directly micro-fabricating prisms on a light guide plate, and is usually used in a backlight module in combination with a reverse prism sheet. As shown in FIG. 1, the prior art backlight module mainly includes a reverse prism sheet 3, a V-cut light guide plate 2 having a tapering thickness, and a reflective film 1 under the reverse prism sheet, and a diffusion film 4 above the reverse prism sheet. The LC panel (not shown) is placed on top of the diffusion film 4. A linear light source/reflector 5 is positioned at the thicker edge of the light guide plate 2. Compared to the earlier conventional backlight modules, the brightness of the backlight module having a V-cut light guide plate can be enhanced by nearly 30%. Therefore, overall power consumption for a particular output brightness can be saved by about one third using such improved backlight module, which is a considerable improvement on energy-saving performance.

Light guide plates used in backlight module are typically made by injection molding. In general, molten polymethyl methacrylate (PMMA) material is filled into a mold cavity having the desired mold structure and a holding pressure is maintained. After the material is allowed to cool down and harden to conform to the configuration of the mold cavity. However, when it comes to V-cut light guide plate, a high failure rate is present as a result of difficulties associated with making the mold cavity and the nature of the above-described injection molding process. The replica of the mold master having V-cut structures made by CNC precision-machining are often mal-manufactured and/or result in defects. Therefore, the manufacturing of V-cut light guide plate becomes more difficult and thereby less cost effective.

Furthermore, the problems with prior art light guide plates are exacerbated by the tightened requirements of lighter-weight, thinner-profile and more flexible structure for LCD devices, which are gradually becoming the mainstream in recent years. Due to the limitations of injection molding, it is not easy to obtain thin and flexible light guide plates manufactured by this method. In particular, when it comes to large LCD panels sizes, the failure rate is even higher.

There remains a need for a back light plate having a structure that is thin and flexible, and efficient in planar light output and easy to manufacture.

SUMMARY OF THE INVENTION

The present invention provides a thin light guide film having a structure that is relatively easy to manufacture with high yield rate. In one aspect of the present invention, the light guide film is flexible. More particularly, the present invention provides a flexible light guide film having a light-adjusting structure in the form of a lenticular-like microstructure on the bottom side of the light guide film (i.e., the side facing away from the liquid crystal panel).

In one embodiment, the light guide film comprises a substrate layer supporting a layer light-adjusting structure. In a further embodiment, the light-adjusting structure comprises an array of longitudinal lenticular lenses laterally arranged in parallel. The light guide film may further comprise a prismatic-like microstructure on the top light emitting side of the light guide film (i.e., the side facing the liquid crystal panel). The light guide film can be fabricated by a process involving coating/embossing of a roll of sheet material (single-sided or double-sided depending on whether both sides of the light guide film are to be structured), in a roll-to-roll continuous process. The sheet material may be clear or transparent, may be coated with beads, and/or particles built-in on the light emitting surface. According to the present invention, the thickness of the light guide can be significantly reduced. In addition, the roll-to-roll process provides for more precise replication of the microstructures on the master mold or drum onto the surface of the light guide film, which in turn reduces the failure rate and manufacturing cost.

DETAILED DESCRIPTION OF THE INVENTION

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

Figure 2:
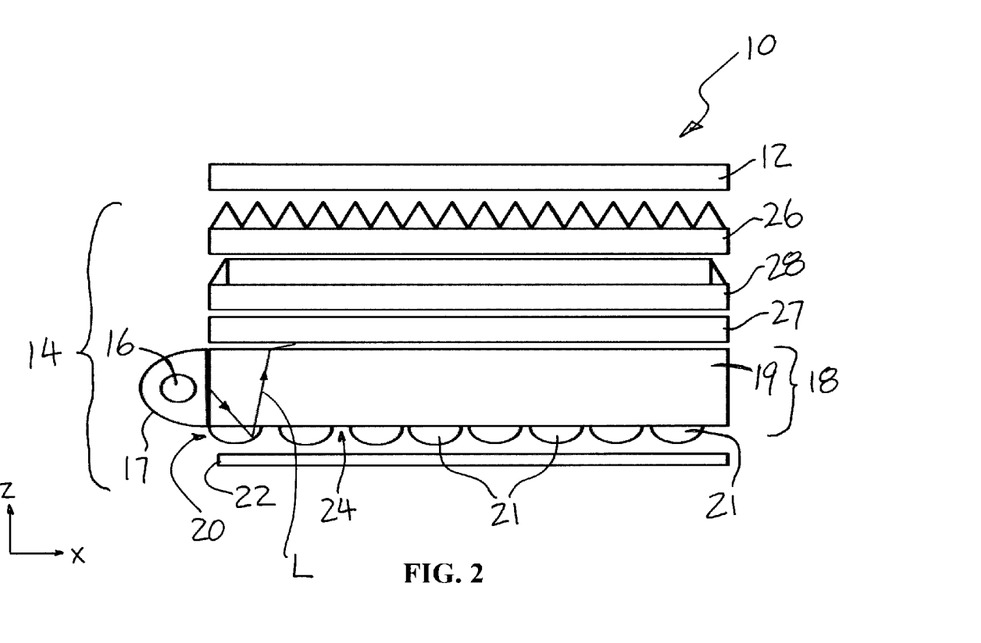
FIG. 2 schematically illustrates the structure of a LCD, which incorporates the light guide plate in accordance with one embodiment of the present invention.

FIG. 2 schematically illustrates the structure of a backlight LCD device, which incorporates the light guide plate in accordance with one embodiment of the present invention. The backlight LCD 10, in accordance with one embodiment of the present invention, comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, which is of the edge-lit type, in which a linear light source 16 (e.g., a row of discrete LEDs or a longitudinal cold cathode fluorescent lamp tube) is provided at an edge of a light guide film 18 in accordance with the present invention. A reflector 17 is provided to direct light from the linear light source 16 through the edge of the light guide film 18 into the light guide film 18. The LC module 12 modulates incident backlight through the module in accordance with image data. While the present invention is described in reference to LC module as a light modulator, the light guide film of the present invention can well be applied to be used with other types of modulation device that modules incident light through the device.

In particular, the present invention is directed to a novel structure of a thin and flexible light guide film having a light-adjusting structure to change the light path. In one embodiment, a first optical layer composed of a flexible transparent material supports a second optical layer formed on the lower side of the first optical layer and having a light-adjusting structure, wherein the first and second optical layers have same or different refractive indices. In accordance with the embodiment of the present invention illustrated in FIG. 2, the thin and flexible light guide film 18 has a clear or transparent, flexible substrate layer 19 supporting a clear or transparent layer of light-adjusting structure 20 generally comprising an array of laterally arranged rows of lenticular lenses 21. The light guide film 18 is structured with the light-adjusting structure 20 defined at the bottom major planar surface facing away from the LC module 12, to distribute and direct light through the flat, smooth top major planar surface facing towards the LC module 12. A reflective sheet 22 may be provided to facilitate trapping any light escaping through the underside of the light guide film 18 and redirecting light back towards the light guide film 18.

In the illustrated embodiment, there are two structured microprism substrates 26 and 28 that are arranged with the longitudinal prism structures generally orthogonal or at a slightly less than orthogonal angle between the two substrates. The microprism substrates 26 and 28 are structured to enhance luminance or brightness, redirecting light closer to a perpendicular viewing axis. A diffuser sheet 27 is provided between the light guide film 18 and the lower microprism substrate 28. Alternatively or in addition, one or both of the microprism substrates 26 and 28 may incorporate diffusing structures at the respective bottom surfaces facing the light guide film 18 to provide both light-collimation and light-diffusing functions, which may obviate the need for separate diffuser sheet(s), thereby further reducing the overall thickness of the LCD 10. Reference is made to co-pending U.S. patent application Ser. No. 13/073,859 filed on Mar. 28, 2011, which has been published as U.S. Patent Publication No. 2001/0234580, and which is fully incorporated by reference herein, as if fully set forth herein.

The light entering the LC module 12 through the combination of optical films illustrated in FIG. 2 is uniform spatially over the planar area of the LC module 12 and has relatively strong normal light intensity.

In the context of the present invention, the inventive optical substrate may be adopted in display devices having display panels that may be flat or curved, and rigid or flexible, which comprise an array of display pixels. Planar light source refers to a light source that provides illumination to cover an area of the array of display pixels. Accordingly, for display panels having a curved image plane of display pixels (such panels may be rigid or flexible), the backlight would cover the array of display pixels in the curved plane, to effectively provide illumination coverage to the curved image plane.

The structure of the lenticular structured surface is described in greater detail below. For ease of reference, the following orthogonal x, y, z coordinate system will be adopted in explaining the various directions. For the embodiment shown in FIG. 2, the x-axis is in the direction across the lenticular lenses 21, also referred to as the lateral or transverse direction of the lenticular lenses 21. The y-axis is orthogonal to the x-axis, generally in the plane of the light guide film 18, in a longitudinal axis or direction of the lenticular lenses 21. The longitudinal direction of a lenticular lens 21 leads from one end to another end of the lenticular lens 21. The lenticular lenses 21 generally lie in the x-y plane. For a rectangular piece of light guide film 18, the x and y-axes would be along the orthogonal edges of the light guide film 18. The z-axis is orthogonal to the x and y-axes. The edge showing the ends of the laterally arranged rows of lenticular lenses 21 lies in the x-z plane, as shown in FIG. 2, which also represents a sectional view in the x-z plane. References to cross sections of the lenticular lenses 21 would be sections taken in x-z planes, at various locations along the y-axis. Further, references to a horizontal direction would be in an x-y plane, and references to a vertical direction would be along the z-direction.

In the illustrated embodiment, the lenticular structured surface comprises a shallow-curved lens structure (e.g., a convex or concave lens structure, or a combination of convex and concave). In the embodiment illustrated in FIG. 2, the lenticular structured surface includes parallel rows of convex lenticular lenses 21, each extending in the y-direction continuously between two opposing edges of the light guide film 18. The lenticular lenses may be concave lenses in another embodiment not shown. In this illustrated embodiment, the curved surfaces of adjacent lenticular lenses 21 are spaced apart (i.e., do not intersect), defining parallel spaces or grooves 24 having longitudinal flat bottoms between lenticular lenses 21. In other embodiment not shown, the curved surfaces of adjacent lenticular lenses may intersect. For the lenticular lenses 21, the x-axis is in the direction across the valleys 24 and lenses 21, also referred to as the lateral or transverse direction of the lenticular structured surface. The y-axis represents the longitudinal axis or direction of the lenticular lenses 21 and grooves 24. The longitudinal direction of lenticular lenses 21 would be in reference to the general direction in which the convex lens section proceed from one end to another end of the lenticular lenses 21. The edge shown in FIG. 2 shows the ends of the laterally arranged rows of lenticular lenses 21 lies in the x-y plane, which also represents a sectional view in the x-z plane.

Figure 6A:
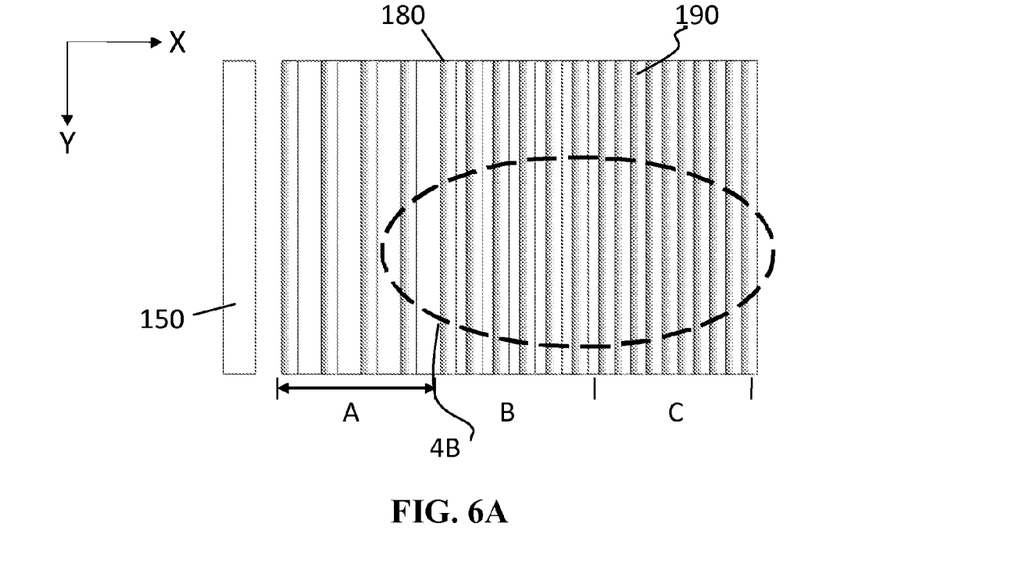
FIG. 6A is a bottom view of a light guide film in accordance with a further embodiment of the present invention.
Figure 6B:
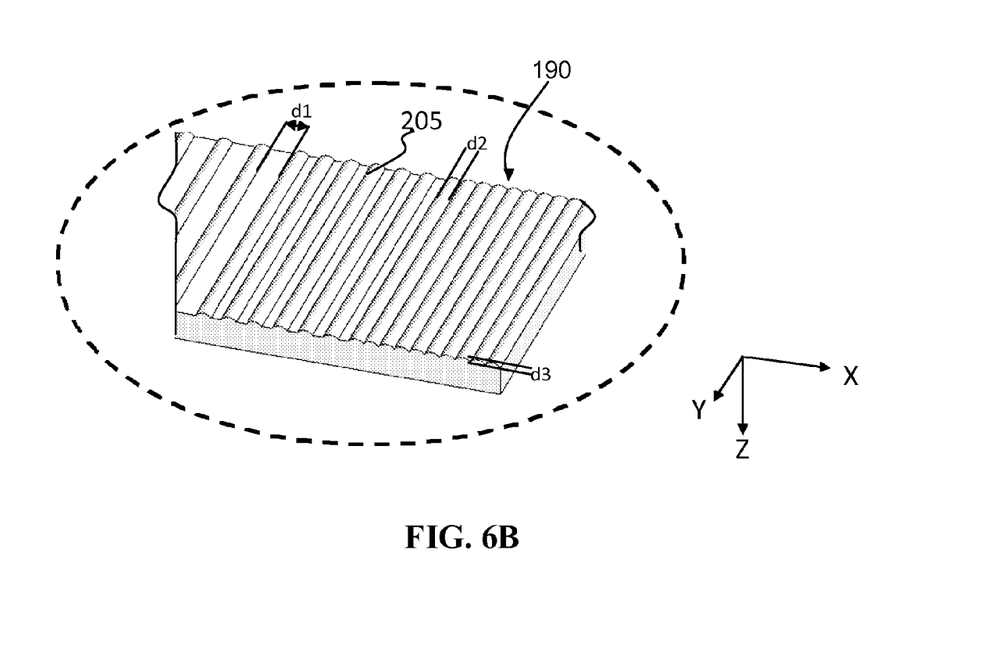
FIG. 6B is a perspective view illustrating the light guide film in FIG. 6A.
Figure 7:
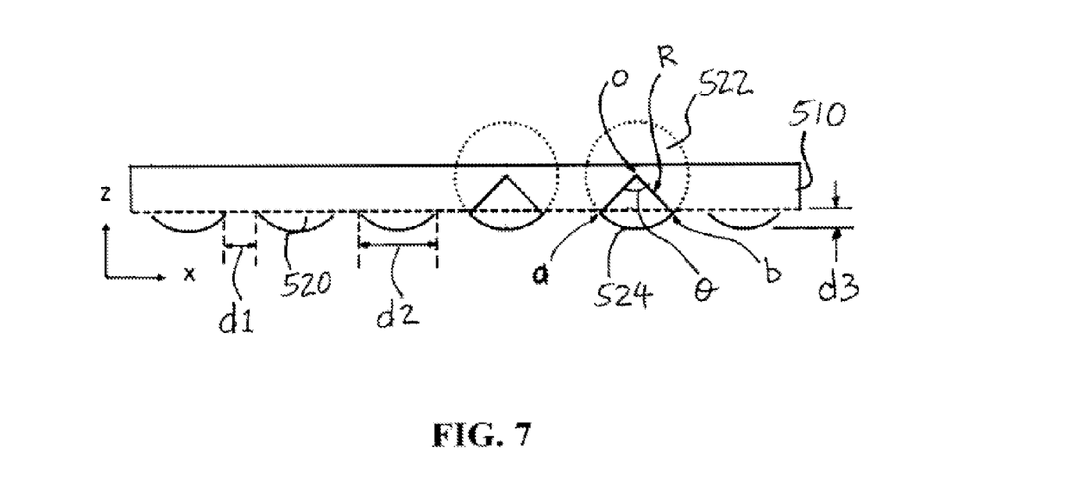
FIG. 7 is a schematic sectional view of a light guide film to illustrate the structural parameters.

Referring also to FIG. 7, which schematic illustrates a cross-sectional view in the x-z plane to illustrate the general structural parameters of a light guide film. Refer to FIG. 7, light guide film 500 includes a substrate layer 510 and a plurality of lenticular lenses 520 having convex curved surfaces 524 formed on bottom surface of the substrate layer 510. The surface 524 of each of the lenticular lenses 520 corresponds substantially to a section of the surface of a circular cylinders 522 having a radius "r" with center "O" in cross-section, which surface section corresponds to a subtended angle θ, and a subtended arc between point "a" and "b" in cross-section. In the sectional view shown in FIG. 7, the lens 520 corresponds to a segment of the circle 522, which is bounded by the chord a-b and the arc a-b. As shown in FIG. 7, adjacent arcuate surfaces 524 of lenticular lenses 520 do not contact one another to form a contiguous or continuous lens surface. (As will be further discussed below, in the embodiment illustrated in FIGS. 6A and 6B, the arcuate surfaces of some of the lenticular lenses may intersect each other. The surface 524 of each lens 520 "bottoms" onto the top of the substrate layer 510, with a flat spacing between adjacent lenses 520. In this illustrated embodiment, the lens width d1 is the same for the discontinuous lenses 520. The spacing pitch d2 is constant within a particular area, but different for different areas.

In a preferred embodiment, the angle θ of lenticular structure is in the range of 5 degrees to 90 degrees, more preferably in the range of 10 degrees to 45 degrees. The height d3 of the lenticular lens structure (measured from the top of the base layer 510, or if the base layer is integral to the lenticular lens structure, measured from the valley between adjacent non-intersecting or non-overlapping lenticular lenses) is identical (or may be variable in other embodiments not shown), preferably in the range of 0.5 μm to 100 μm, preferably in the range of 1 μm to 60 μm, more preferably in the range of 1 μm to 45 μm. The curvature of the lenticular lenses is the same. The distance between centers O of adjacent lenses (i.e., d1+d2)=5 μm to 1000 μm.

In the illustrated embodiment in FIG. 2, the lenticular lenses 21 each has same sectional profile in the y-z plane. References to cross sections of lenticular lenses 21 would be sections taken in y-z planes, at various locations along the x-axis. Further, references to a horizontal direction would be in an x-y plane, and references to a vertical direction would be along the z-direction. In this embodiment, the curvature and height of the lenticular lenses 21 are respectively the same for all the lenticular lenses, and the distance pitch between two discontinuous lenticular lenses 21 of the structured lenticular surface is the same. In this embodiment, the surface of each lens 21 bottoms onto the top of the substrate layer 19. While FIG. 2 illustrates isolated or separated lenticular lenses 21 attached to the substrate layer 19, it is understood that the layer of lenticular lenses 21 may include lenticular lenses 21 that are spaced apart but interconnected laterally (e.g., by a thin web of the same material; see, e.g., FIG. 4). The overall structure of such layer of lenticular lenses 21 resembles a layer of lenticular lenses 21 supported on a thin base layer of a desired height to maintain integrity of adhesion to the substrate layer 19.

In this embodiment, the sectional profile of the lenticular lenses 21 conforms to a segment of a circle (i.e., the lenticular lenses 21 conform to surface of part of a cylinder). It is well within the scope of the present invention to adopt lenticular surfaces that conform to cylinders of different cross-sections other than a circle (e.g., an ellipse or other cross-sections of regular or irregular geometries).

In the illustrated embodiment in FIG. 2, the light guide film 18 comprises two separate layers, including the flexible substrate layer 19, and the layer of light-adjusting structure 20. The structured layer 20 is adhered to the substrate layer 19 to form the overall light guide film 18. It can be appreciated that the light guide film 18 may be formed from a single integrated physical layer of material, instead of two separate physical layers, without departing from the scope and spirit of the present invention. The light guide film 18 may be a unitary or monolithic body, including a base portion bearing the surface structures of the lenticular lenses 21.

The lenticular structure provides improved guidance of light towards the top light output surface of the light guide film 18, so as to increase the luminance of the LC module 12. Following the light path L illustrated in FIG. 2, when light emitted from a light source 16 is projected into the substrate layer 19, the light enters the layer of lenticular lenses 21 from the substrate layer 19, such that a first refraction occurs. When the light passes through the layer of lenticular lenses 21, the lenticular lenses 21 change the light path. Then, the light passes through the substrate layer 19 towards the upper surface of the substrate layer 19 (which is also the upper surface of the light guide film 18. Finally, the light is emitting through the upper surface of the light guide film 18. Overall, a uniform planar surface light source is defined by the light guide film 18.

It can be appreciated that in the thin and flexible light guide film 18 of the present invention, the light traveling path L can be controlled by controlling the refractive index difference between the substrate layer 19 and the layer of lenticular lenses 21, and controlling the refraction and total reflection caused by the light-adjusting structure of the layer of lenticular lenses 21. As compared to those conventional V-cut light guide plates described in the Background section above, the present invention simplifies the design of the light-adjusting structured surface, as the lenticular lenses have relatively low requirements for precision processing technology, and therefore the yield of the light guide film 18 can be improved.

Figure 3:
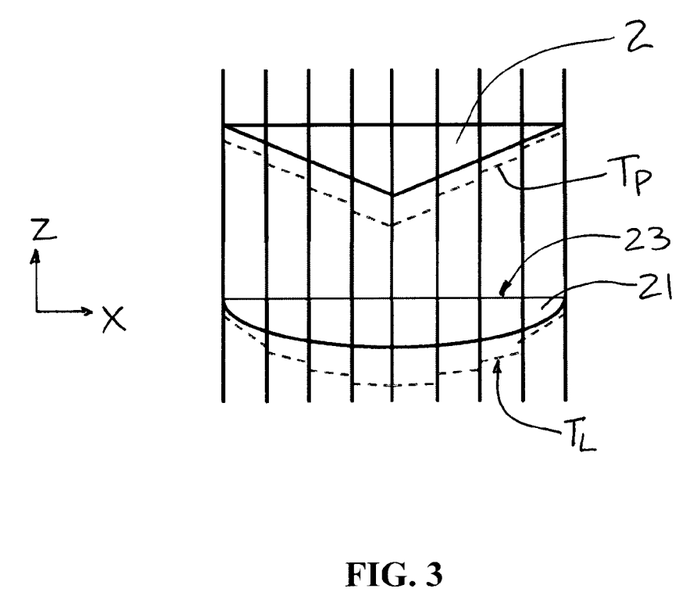
FIG. 3 is a schematic sectional view comparing the surface profiles of a prism and a lenticular lens.

The form of the light-adjusting structure of the light guide film 18 may be a regular or irregular lenticular-like structure. The improved effect of the light-adjusting structure of the light guide film 18 as compared to a prismatic structure of the conventional light guide plate 2 (FIG. 1) can be better explained in reference to FIG. 3. As shown in FIG. 3, the upper inverted triangular represents the sectional profile of a conventional prismatic structure of the light guide plate 2 shown in FIG. 1. The lower lens represents the sectional profile of the lenticular lens 21 of the light guide film 18. The dotted line segments $T_P$ and $T_L$ represent the slopes at various surface segments of the lower surface of the respective sectional profiles. As can be seen from FIG. 3, because the slope $T_P$ of the prismatic structure 2 is constant, the level of breaking TIR (total internal reflection) and redirecting light is hard for design and manufacture. On the contrary, for the lenticular lens 21, the slopes $T_L$ of the tangents vary at various locations across the convex lens surface of the lens 21. This level of breaking TIR makes design and manufacture much easier. The freedom of design greatly increase by considering the effect of tangent varying on breaking of TIR, and the tangent vary can be adjusted by changing the shape and/or size of the lenticular lenses. For example, the breaking level of total internal reflection may be modulated by: (a) distance between two adjacent lenses 21; and/or (b) radius of curvature of the lenses 21. Using lenticular-like structure as light-adjusting structure in the present invention, more flexibility in design would be available.

In the illustrated embodiment, the layer of lenticular lenses 21 and the substrate layer 19 may be made of the same or different material. The layer of lenticular lenses 21 and the substrate layer 19 may be formed using an optically transparent material, preferably a polymerizable resin, such an ultraviolet or visible radiation-curable resin, such as UV curable adhesive. The light guide film 18 can be fabricated by a process involving coating/embossing of a roll of sheet material (single-sided or double-sided depending on whether both sides of the light guide film are to be structured), in a roll-to-roll continuous process. Generally, the structured lenticular surface is formed by applying a coatable composition comprising a polymerizable and crosslinkable resin onto a master mold or master drum and undergoing a hardening process. The lenticular structures may be formed on a separate base film layer by die assemblies, press rolling machines, mold pressing assemblies or other equivalent apparatuses. The base film of the layer 20 of lenticular lenses 21 is combined with the flexible substrate layer 19, by simply stacking or applying adhesives such as pressure sensitive adhesive (PSA) to the layers to form a structure of the light guide film 18. It is apparent that many techniques and combinations of manufacture methods may be applied to obtain the combination of the structured lenticular surface and the substrate layer, or equivalent thereof. It is also contemplated that the light guide film 18 can first be formed in a thin format, and then further combined with another significantly thicker substrate (e.g., using above described assembly process), to obtain a light guide plate of a thicker format, without departing from the scope and spirit of the present invention.

As noted above, most conventional V-cut light guide plates are formed by injection molding, so the refractive index of the prismatic structure on the underside facing away from the LC module is the same as that of the base substrate, and the prisms should be further designed (for example, in terms of the angle, the width, or the depth) so as to control the reflection direction of light in order to achieve the effect of guiding the direction of the light path. In contrast, for the thin and flexible light guide film of the present invention, the layer of light-adjusting structure 20 is formed on the substrate layer 19 by a coating method, such that the layers can have different refractive indices, thereby the light path can be controlled to achieve the desired effect of guiding the direction of the light towards the light emitting surface of the light guide film towards the LC module 12. According to one embodiment of the present invention, the absolute value of the difference in the refractive indices of the two layers is in the range from 0.001 to 0.6 (either layer can have a higher refractive index than the other).

In another embodiment, the substrate layer 19 and the layer of lenticular lenses 21 can be integrally-formed by molding, pressing, embossing, calendaring or extrusion onto a thicker transparent film substrate. Further discussions of processes for forming a substrate having structured surfaces may be referenced to U.S. Pat. No. 7,618,164, which is incorporated by reference herein.

The flexible transparent material suitable for the substrate layer 19 of the thin and flexible light guide film 18 can be made of various types of material known to those having ordinary skill in the art, such as plastics, which may include, for example but not limited to, polyester resins, such as polyethylene terephthalate (PET) and polyethylene naphthalate (PEN); polyacrylate resins, such as polymethyl methacrylate (PMMA); polyimide resins; polyolefin resins, such as polyethylene (PE) and polypropylene (PP); polycycloolefin resins; polycarbonate resins; polyurethane resins; polyvinyl resins, such as polyvinyl alcohol (PVA), or polyvinyl chloride (PVC); triacetate cellulose (TAC); or a mixture thereof. In one embodiment, the preferred substrate is polymethyl methacrylate (PMMA). Likewise, the layer of lenticular lenses 21 can be made of similar materials as the substrate layer 19, such as acrylic resins or any other transparent material known to one skill in the art, which is suitable for adhering to the substrate layer 19.

The thickness of the substrate layer 19 is constant throughout (i.e., the opposing surfaces of the substrate layer 19 are parallel), which may be in the range from 100 um to 800 um, more preferably from 125 um to 600 um. In another embodiment not shown, the substrate layer 19 may be tapered, e.g., with thickness thinning from the light input edge to the opposing edge. The thickness of the layer of lenticular lenses 21 of the light guide film 18 (or the height of the lenticular lenses 21) may be between 0.5 um and 100 um, preferably between 1 um and 60 um, and more preferably between 1 um and 45 um.

In the embodiment in FIG. 2 (and referring also to FIG. 7), the vertical height d3 of the lenticular lenses 21 (crown height of the lenses measured from the top of the substrate layer 19, or if the substrate layer 19 is integral to the lenticular lenses 21, measured from the valley between non-intersecting adjacent lenticular lenses 21) is identical, preferably in the range of 0.5 μm to 100 μm, preferably in the range of 1 μm to 60 μm, and more preferably in the range of 1 μm to 45 μm. The curvature of the lenticular lenses is the same. Spacing d1 (between edges of adjacent lenticular lenses) is the same=0 μm to 1000 μm; width d2 (distance between edges at the sides of the convex surface) is the same for all the lenticular lenses=0 μm to 1000 μm. The center spacing between adjacent lenticular lenses (i.e., d1+d2)=3 μm to 1200 μm. If there is a thin base film (web) integral to the lenticular lenses 21 in the layer 20 to facilitate maintaining integrity of the adhesion (see base film 42 in FIG. 4), the thickness of the film (or bottom thickness) may range between 5 to 800 micrometers.

The present inventive concept may be extended to include light-adjusting structure comprising lenticular lenses that are coated with beads, and/or particles built-in on the lenticular surfaces.

Figure 4:
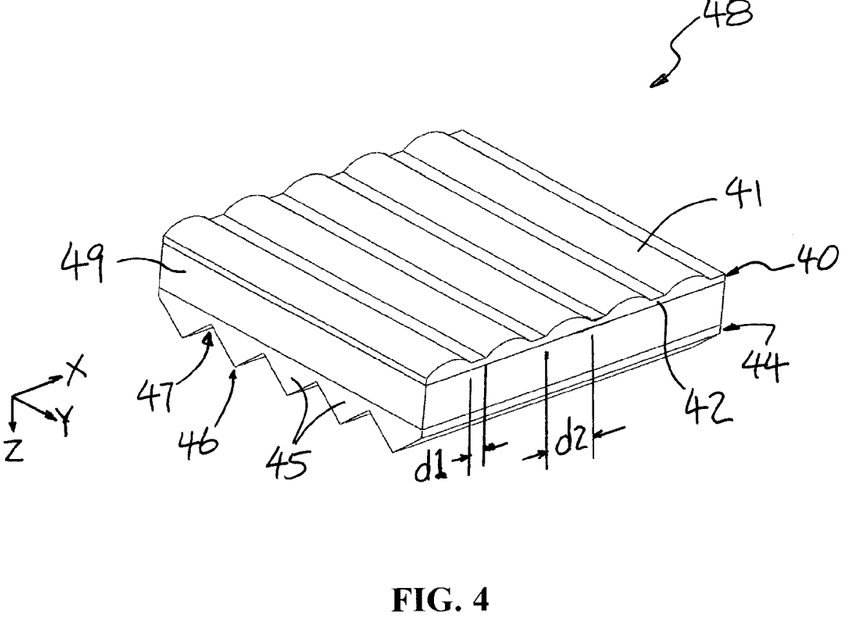
FIG. 4 is a perspective view illustrating a light guide film in accordance with another embodiment of the present invention.
Figure 5:
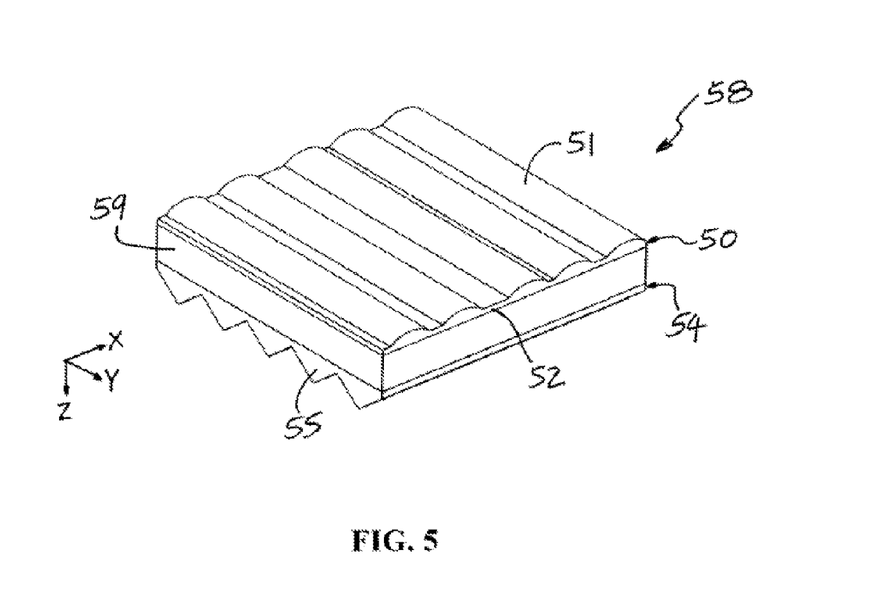
FIG. 5 is a perspective view illustrating a light guide film in accordance with yet another embodiment of the present invention.

FIG. 4 and FIG. 5 are other embodiments of light guide films of the present invention which combines prism and lenticular-like structures on two sides of a substrate.

In the embodiment of FIG. 4, the light guide film 48 has a structure that combines prismatic and lenticular structures on opposing sides of the substrate layer 49. Specifically, the light guide film 48 has a structured lenticular surface 40 and a structured prismatic surface 44. The lenticular lenses 41 are similar in structure to the lenticular lenses 21 in the previous embodiment, except that the layer 40 of lenticular lenses 41 comprises a thin base film 42 integral to the convex lenses. The spacing d1, width d2 and crown height d3 of the lenticular lenses 41 can remain constant, or can vary by keeping two of the parameters (d1, d2, d3) constant and varying one parameter across the light guide film, or keeping one of the parameters constant and varying the other two parameters across the light guide film.

In this illustrated embodiment, the structured prismatic surface 44 is a light output surface that enhances brightness along an orthogonal view axis (i.e., improves light collimation) and the structured lenticular surface 40 is the light-adjusting surface of the light guide film 48 for internal reflections as in the previous embodiment. As illustrated in FIG. 4, the prismatic surface 44 includes parallel rows of contiguous or continuous longitudinal prisms 45, extending between two opposing edges of the substrate layer 49. The rows of longitudinal prisms 45 are arranged in parallel laterally (side-by-side), defining parallel peaks 46 and valleys 47. The sectional profile of the peak 46 is symmetrical about vertical (viewed in the y-z plane). The peak vertex angle may be right angled, and the peaks are of constant or similar height and/or the valleys are of constant or similar depth, across the plane of the prismatic surface 44. The distance or pitch between adjacent peaks/valleys is constant in the illustrated embodiment of FIG. 4. In the illustrated embodiment, the structured prismatic surface 44 and the structured lenticular surface 40 are generally parallel to each other in the overall light guide film structure (i.e., do not form an overall substrate structure that is generally tapered like a light guide plate in a backlight module). In another embodiment, the height or the prisms may vary in the longitudinal and/or lateral directions, across the plane of the light guide film. Laterally adjacent prisms may be disjoined (i.e., spacing present between adjacent prisms). In FIG. 4, the longitudinal axis (in the y-direction) of the lenticular lenses 41 is orthogonal to the longitudinal axis (in the x-direction) of the prisms 45.

The double-sided light guide film 48 of FIG. 4 can be manufactured involving similar processes described above for the previous embodiment. The light guide film 48 can be fabricated by a process involving coating/embossing both sides of a roll of sheet material, in a roll-to-roll continuous process. Either or both of the lenticular structure surface 40 and the prismatic surface 44 can be formed as separate layers to the substrate layer 49, or integral to the substrate layer 49. In the illustrated embodiment in FIG. 4, the light guide film 48 comprises three separate layers, including the prismatic surface layer 44, the flexible substrate layer 49, and the layer of structured lenticular surface 40. The prismatic surface layer 44 and the structured lenticular layer 40 are adhered to the substrate layer 49 to form the overall light guide film 48. It can be appreciated that the light guide film 48 may be formed from a single integrated physical layer of material, instead of three separate physical layers, without departing from the scope and spirit of the present invention. The light guide film 48 may be a unitary or monolithic body, including a base portion bearing the surface structures of the prisms 45 and the lenticular lenses 41.

In the embodiment of FIG. 5, like the embodiment of FIG. 4, the light guide film 58 has a structure that combines prismatic and lenticular structures on opposing sides of the substrate layer 59. Specifically, the light guide film 58 has a structured lenticular surface 50 and a structured prismatic surface 54. In this embodiment, the layer 50 of lenticular lenses 51 comprises a thin base film 52 integral to the convex lenses 51. The structure of the lenticular lenses is similar to the earlier embodiment, except that the spacing d2 between edges of two discontinuous adjacent lenticular lenses 51 of the structured lenticular layer 50 is variable or different across the section in the x-direction. The width d2 of the lenticular lenses are same and constant. The height of the lenticular lenses 51 (measured from the top of the base film 52) is identical.

The prismatic surface 54 includes parallel rows of contiguous or continuous longitudinal prisms 55 similar to the structure of the prismatic surface 45. The double-sided light guide film 58 of FIG. 5 can be manufactured involving similar processes described above for the previous embodiments. In FIG. 5, the longitudinal axis (in the y-direction) of the lenticular lenses 51 is orthogonal to the longitudinal axis (in the x-direction) of the prisms 55.

In other embodiments not shown, instead of or in addition to having prismatic surface (44, 54 in the previous embodiments), the light emitting surface of the light guide film may be coated with beads and/or particles built-in, e.g., on the substrate layer, or the prismatic surfaces if provided.

In other embodiments not illustrated, the vertical height of the structures of the lenticular lenses may be variable. Further, the radius of curvature of different lenticular lenses may also vary and/or different lenticular surfaces may conform to cylinders of different cross-sections other than a circle (e.g., an ellipse or other cross-sections of regular or irregular geometries) and further of varying sizes. Longitudinal lenticular structures having a uniform cross-section defining different convex curve surface profiles are also contemplated (e.g., same profile or different profiles for different lenticular lenses).

Experimental Results:

Experiments were carried out to determine the effect of dimensional variations in the lenticular lenses on the uniformity of light brightness distribution of the light guide film of the present invention.

Referring to the further embodiment of FIGS. 6A and 6B, the light guide film 180 studied has a diagonal size of about 10.1 inches and is formed by using a transparent material such as acrylic resin. FIG. 6A is a schematic planar view of the bottom surface of the light guide film 180. FIG. 6B is a schematic perspective view of the circle region 6B of the light guide film 180. A light source 150 is near one side of the light guide film 180. In the present embodiment, the bottom surface of the light guide film 180 has fourteen defined areas which have, for example, a width of about 10 cm, from area A to area N. A plurality of lenticular lens patterns 205 are disposed on the bottom surface 190 (not facing the LC module) of the light guide film 180 such that the lenticular patterns 205 are approximately parallel to the light source 150, and arranged to have constant spacing d1 within each of areas A to N (i.e., with each area, the spacing between adjacent lenticular lenses is same and constant, but the spacings for the different areas are different). In this embodiment, the width d2 and height d3 of the lenticular lenses are same and constant, and at least some of the lenticular lenses do not intersect each other (e.g., in the area closer to area A). In the embodiment illustrated in FIGS. 6A and 6B, the arcuate surfaces of some of the lenticular lenses may overlap or meet each other (e.g., in areas closer to area N).

Table 1 shows the initial design dimensions of the light guide film 180. As shown in Table 1, variables d2, d3 and R are maintained constant, and d1 is varied in different areas A to N. The uniformity of light output from such light guide film design is not ideal; e.g., based on the "13-point" test adopted by the industry, uniformity in brightness distribution is about 30% only.

TABLE 1

| | AREA | | | | | | | | | | | | | |
|---|---|---|---|---|---|---|---|---|---|---|---|---|---|---|
| | A | B | C | D | E | F | G | H | I | J | K | L | M | N |
| d1 + d2(μm) | 503 | 490 | 469 | 441 | 406 | 324 | 287 | 240 | 208 | 178 | 151 | 125 | 117 | 105 |
| d2(μm) | 69.5 | 69.5 | 69.5 | 69.5 | 69.5 | 69.5 | 69.5 | 69.5 | 69.5 | 69.5 | 69.5 | 69.5 | 69.5 | 69.5 |
| d3(μm) | 3 | 3 | 3 | 3 | 3 | 3 | 3 | 3 | 3 | 3 | 3 | 3 | 3 | 3 |
| R(μm) | 200 | 200 | 200 | 200 | 200 | 200 | 200 | 200 | 200 | 200 | 200 | 200 | 200 | 200 |

It has been found that by increasing the radius of curvature (R) (d2 value also increased corresponding to an increase in R), and keeping the R value constant in all 14 predefined areas A to N, better brightness uniformity across the light guide film from light diffusion by internal reflection can be achieved (e.g., to 75%). By further fixing the (d1+d2) value and the depth d3 of the lenticular lenses, the design of the light guide film is further optimized, with an increase in brightness uniformity from 30% to 40%.

To achieve more freedom of design, the combination of the variables may be modulated. By fixing (d1+d2) and R values, parameters d2 and d3 are further adjusted and brightness uniformity at 40% to 68% can be achieved. A relationship may be developed for optimizing d1+d2 value and d3 value: the brightness uniformity may be further increased (e.g., to over 75%) by using such optimized relationship).

By using the structure of the light guide film described above, the brightness is more uniformly distributed over the LCD display area. Furthermore, referring back to FIG. 2, a reflecting member such as reflector sheet 22, can be incorporated into the backlight module 14 by wrapping or surrounding the light guide film 18. The reflecting sheet 22 facilitates collection of escaping light from the light guide film 18, and reflect such light back into the light guide film 18. By such a light recycling function, further maximization of the brightness of the backlight module 14 can be achieved.

In accordance with the present invention, the light guide film (e.g., 18 in FIG. 2) comprises a structure lenticular light-adjusting surface, which improves distribution of light output across the plane of the light guide film, when applied in an LCD for example. An inventive LCD incorporating the inventive optical substrate in accordance with the present invention may be deployed in an electronic device.

The optical substrates in accordance with the present invention may be used with LCDs to be deployed for displays, for example, for televisions, notebook computers, monitors, portable devices such as cell phones, digital cameras, PDAs and the like, to make the displays brighter.

Figure 8:
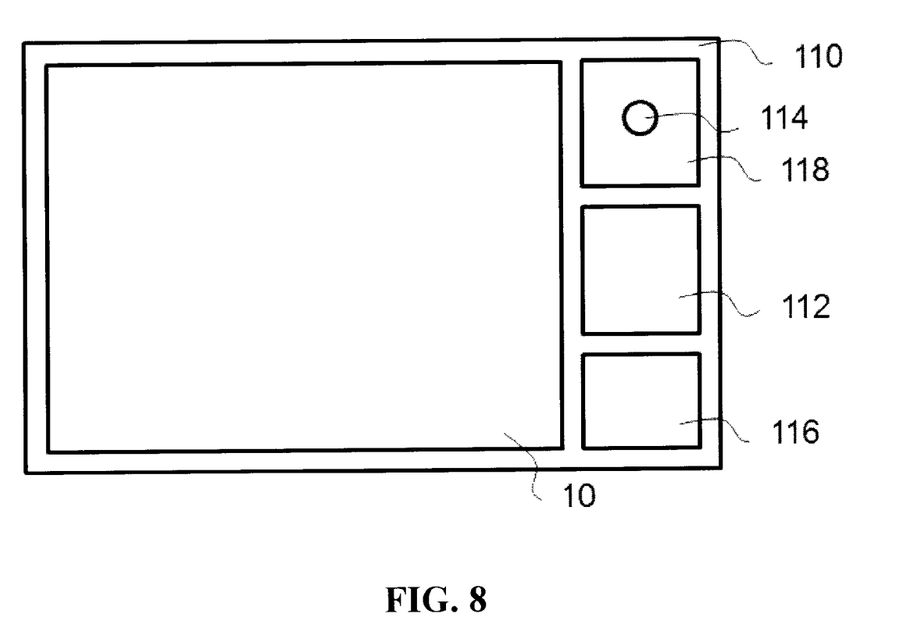
FIG. 8 illustrates an electronic device comprising an LCD panel that incorporates the inventive light guide film of the present invention, in accordance with one embodiment of the present invention.

As shown in FIG. 8, an electronic 110 (which may be one of a PDA, mobile phone, television, display monitor, portable computer, refrigerator, etc.) comprises the inventive backlight LCD 10 in accordance with one embodiment of the present invention. The LCD 10 comprises the inventive light guide film described above. The electronic device 110 may further include within a suitable housing, a user input interface such as keys and buttons (schematically represented by the block 116), image data control electronics, such as a controller (schematically represented by block 112) for managing image data flow to the LCD 10, electronics specific to the electronic device 110, which may include a processor, A/D converters, memory devices, data storage devices, etc. (schematically collectively represented by block 118), and a power source such as a power supply, battery or jack for external power source (schematically represented by block 114), which components are well known in the art.

While the present invention has been described in connection with LCD devices, the light guide film may be applied to other applications. The inventive light guide may be in the form of a film, sheet, plate, and the like, which may be flexible or rigid, having a lenticular structured surface, and may in addition have an opposing prismatic structured surface.

It will be apparent to those skilled in the art that various modifications and variations can be made to the disclosed structures and processes of the present invention without departing from the scope or spirit of the invention. In view of the foregoing descriptions, it is intended that the present invention covers modifications and variations of this invention if they fall within the scope of the following claims and their equivalents.

We claim:

1. A light guide device, comprising:
a light guide having a body, the body comprising a first surface, a second surface opposite to the first surface and a lateral surface connecting the first surface and the second surface, wherein the second surface is structured with a plurality of protruding lenticular portions extending from a first edge of the second surface to a second edge of the second surface opposite to the first edge of the second surface, wherein each of the plurality of protruding lenticular portions protrudes in a direction away from the first surface, wherein each two adjacent protruding lenticular portions of the plurality of protruding lenticular portions has a spacing portion therebetween; and
a reflecting member, disposed over the outer surfaces of the plurality of protruding lenticular portions, wherein the inner surfaces of the plurality of protruding lenticular portions and the reflecting member are used for reflecting lights such that lights received from the lateral surface are outputted to the first surface of the body primarily through the inner surfaces of the plurality of protruding lenticular portions.

2. The light guide device according to claim 1, wherein the body comprises:
a substrate; and a structured layer disposed on the substrate to define the plurality of protruding lenticular portions.

3. The light guide device according to claim 2, wherein the material of the substrate is the same as the material of the structured layer.

4. The light guide device according to claim 2, wherein the material of the substrate is different from the material of the structured layer.

5. The light guide device according to claim 2, wherein the refractive index of the substrate is different from the refractive index of the structured layer.

6. The light guide device according to claim 5, wherein the difference of the refractive index of the substrate and the refractive index of the structured layer is in the range from 0.001 to 0.6.

7. The light guide device according to claim 1, wherein the first surface comprises micro-structures.

8. The light guide device according to claim 7, wherein the micro-structure comprises prismatic structures.

9. The light guide device according to claim 1, wherein the plurality of protruding lenticular portions have the same height.

10. The light guide device according to claim 1, wherein the plurality of protruding lenticular portions have the same width.

11. The light guide device according to claim 1, wherein at least some of the protruding lenticular portions have same spacing between adjacent protruding lenticular portions.

12. The light guide device according to claim 1, wherein at least some of the protruding lenticular portions have different spacing between adjacent protruding lenticular portions.

13. The light guide device according to claim 1, wherein each of the protruding lenticular portions have a convex surface extending from a reference plane defined by the spacing portions.

14. The light guide device according to claim 1, wherein the first surface and the lateral surface intersect at a third edge, and the second surface and the lateral surface intersect at a fourth edge, wherein the plurality of protruding lenticular portions extend substantially parallel to the third edge and the fourth edge; wherein the protruding lenticular portions are coplanar.

15. The light guide device according to claim 1, wherein the spacing of the spacing portion between adjacent protruding lenticular portions gradually decreases when the distance between the spacing portion and the lateral surface receiving the light increases.

16. The light guide device according to claim 1, wherein each of the protruding lenticular portions protrudes with a height above the spacing portion.

17. The light guide device according to claim 1, wherein each of the plurality of protruding lenticular portions is a lenticular lens.

18. The light guide device according to claim 1, wherein the spacing portion is flat.

19. A light guide device, comprising:
a light guide having a body, the body comprising a first surface, a second surface opposite to the first surface and a lateral surface connecting the first surface and the second surface, wherein the second surface is structured with a plurality of protruding lenticular portions extending in a first direction, wherein each of the plurality of protruding lenticular portions protrudes in a direction away from the first surface, wherein each two adjacent protruding lenticular portions of the plurality of protruding lenticular portions has a spacing portion therebetween; and
a reflecting member, disposed over the outer surfaces of the plurality of protruding lenticular portions, wherein the inner surfaces of the plurality of protruding lenticular portions and the reflecting member are used for reflecting lights such that lights received from the lateral surface are outputted to the first surface of the body primarily through the inner surfaces of the plurality of protruding lenticular portions.

20. The light guide device according to claim 19, wherein the body comprises:
a substrate; and
a structured layer disposed on the substrate to define the plurality of protruding lenticular portions.

21. The light guide device according to claim 19, wherein each of the protruding lenticular portions have a convex surface extending from a reference plane defined by the spacing portions.

22. The light guide device according to claim 19, wherein the spacing of the spacing portion between adjacent protruding lenticular portions gradually decreases when the distance between the spacing portion and the lateral surface receiving the light increases.

23. The light guide device according to claim 19, wherein each of the protruding lenticular portions protrudes with a height above the spacing portion.

24. The light guide device according to claim 19, wherein each of the plurality of protruding lenticular portions is a lenticular lens.

25. The light guide device according to claim 19, wherein the first surface and the lateral surface intersect at a third edge, and the second surface and the lateral surface intersect at a fourth edge, wherein the plurality of protruding lenticular portions extend substantially parallel to the third edge and the fourth edge; wherein the protruding lenticular portions are coplanar.

* * * * *